United States Patent
Clauss et al.

(10) Patent No.: US 11,267,435 B2
(45) Date of Patent: Mar. 8, 2022

(54) AIRBAG ASSEMBLY FOR A MOTOR VEHICLE

(71) Applicant: DAIMLER AG, Stuttgart (DE)

(72) Inventors: Yves Clauss, Potsdam (DE); Till Heinrich, Stuttgart (DE); Ingo Kalliske, Potsdam (DE); Marco Porstmann, Glienicke/Nordbahn (DE); Norman Steinke, Berlin (DE)

(73) Assignee: DAIMLER AG, Stuttgart (DE)

( * ) Notice: Subject to any disclaimer, the term of this patent is extended or adjusted under 35 U.S.C. 154(b) by 22 days.

(21) Appl. No.: 16/648,728

(22) PCT Filed: Jun. 20, 2018

(86) PCT No.: PCT/EP2018/066424
§ 371 (c)(1),
(2) Date: Mar. 19, 2020

(87) PCT Pub. No.: WO2019/057355
PCT Pub. Date: Mar. 28, 2019

(65) Prior Publication Data
US 2020/0269802 A1    Aug. 27, 2020

(30) Foreign Application Priority Data

Sep. 20, 2017    (DE) .................. 10 2017 008 818.7

(51) Int. Cl.
*B60R 21/38* (2011.01)
*B60R 21/36* (2011.01)
(Continued)

(52) U.S. Cl.
CPC .......... *B60R 21/36* (2013.01); *B60R 21/0136* (2013.01); *B60R 21/38* (2013.01); *B60R 2021/01013* (2013.01)

(58) Field of Classification Search
CPC .............................. B60R 21/34; B60R 21/36
See application file for complete search history.

(56) References Cited

U.S. PATENT DOCUMENTS

| 7,614,472 | B2 | 11/2009 | Kalliske et al. | |
| 7,988,183 | B1 * | 8/2011 | Okamoto | B60R 21/36 280/728.2 |

(Continued)

FOREIGN PATENT DOCUMENTS

| CN | 104139762 A | 11/2014 |
| DE | 102004029757 A1 | 1/2006 |

(Continued)

OTHER PUBLICATIONS

International Search Report dated Aug. 24, 2018 in related/corresponding International Application No. PCT/EP2018/066424.

(Continued)

*Primary Examiner* — Barry Gooden, Jr.
(74) *Attorney, Agent, or Firm* — Patent Portfolio Builders PLLC (57) ABSTRACT

An airbag arrangement for a motor vehicle includes an airbag, which can be unfolded by filling with a gas, and a sheathing, in which the airbag is arranged before and after filling. The airbag is provided and is to be arranged on the motor vehicle in such a way that, before filling, it is located in the region of a first end of the sheathing and/or a vehicle pillar of the motor vehicle and can be unfolded by filling inside the sheathing and along at least one section of the vehicle pillar up to a second end of the sheathing and/or the vehicle pillar. The invention further relates to a motor vehicle having such an airbag arrangement.

15 Claims, 5 Drawing Sheets

(51) Int. Cl.
 *B60R 21/34* (2011.01)
 *B60R 21/0136* (2006.01)
 *B60R 21/01* (2006.01)

(56) References Cited

U.S. PATENT DOCUMENTS

| | | | |
|---|---|---|---|
| 9,988,011 B2 | 6/2018 | Battermann et al. | |
| 2003/0192731 A1* | 10/2003 | Kikuchi | B60R 21/36 180/274 |
| 2004/0232663 A1* | 11/2004 | Takimoto | B60R 21/2338 280/730.1 |
| 2005/0257979 A1* | 11/2005 | Hamada | B60R 21/36 180/274 |
| 2007/0023223 A1* | 2/2007 | Okamoto | B32B 17/10761 180/274 |
| 2010/0164203 A1* | 7/2010 | Inoue | B60R 21/36 280/728.2 |
| 2010/0252351 A1* | 10/2010 | Okamoto | B60R 21/36 180/274 |
| 2011/0278087 A1* | 11/2011 | Okamoto | B60R 21/36 180/274 |
| 2011/0291391 A1* | 12/2011 | Okamoto | B60R 21/36 280/728.2 |
| 2016/0288764 A1* | 10/2016 | Suzuki | B60R 21/36 |
| 2017/0217400 A1* | 8/2017 | Battermann | B60R 21/36 |
| 2020/0101918 A1* | 4/2020 | Nagasawa | B60R 21/213 |

FOREIGN PATENT DOCUMENTS

| | | | |
|---|---|---|---|
| DE | 102014010872 A1 * | 1/2016 | B60R 21/36 |
| DE | 102014010872 A1 | 1/2016 | |
| EP | 1479574 A1 | 11/2004 | |
| EP | 2105358 A1 | 9/2009 | |
| JP | H07108903 A | 4/1995 | |
| JP | H07125606 A | 5/1995 | |
| WO | 2004007247 A2 | 1/2004 | |

OTHER PUBLICATIONS

Written Opinion dated Aug. 24, 2018 in related/corresponding International Application No. PCT/EP2018/066424.
Office Action dated Oct. 9, 2021 in related/corresponding CN Application No. 201880060733.0.

* cited by examiner

AIRBAG ASSEMBLY FOR A MOTOR VEHICLE

BACKGROUND AND SUMMARY OF THE INVENTION

Exemplary embodiments of the invention relate to an airbag arrangement for a motor vehicle, in particular for protecting a person located outside the motor vehicle and a motor vehicle having such an airbag arrangement.

Such an airbag arrangement comprises an airbag, which can be inflated from an unfilled starting state into an unfolded state by filling it with a gas provided by a gas generator, and a sheathing inside which the airbag is arranged before the filling in a starting state and after the filling in an unfolded state.

Such airbag arrangements can be used, for example, as a drive for deflecting a part of a shell of a motor vehicle for protecting the person located outside the vehicle. By deflecting the part of the shell, e.g., an engine hood, in the event of a crash, the possibility is created that the collision energy of the person colliding therewith can be relieved in a controlled manner (by moving or deforming the engine hood in opposition to the deflection direction), and the contact with the rigid vehicle components placed below it (e.g. an engine block) can be reduced or even avoided.

Elongated airbags are known from DE 10 2014 010 872 A1, which serve for respectively covering one of two A-pillars of the motor vehicle and simultaneously function as actuators for deflecting the engine hood. In addition, the airbags are each surrounded by a fabric tube as sheathing, which is shortened when filling the airbags in its extension direction along the A-pillars and thus introduces a tensile force into the engine hood for its deflection. With such an arrangement, both the airbag and the surrounding fabric tube must be housed in the A-pillar in a non-use state (non-activated state). However, there is only limited housing space available as a result of the relatively small cross-section of the A-pillars, which significantly limits the size of the airbag. Yet this, above all in the dimension transverse to the extension direction of the A-pillars, is influential for the achievable shortening of the fabric tube and thus ultimately crucial for the extent of the deflection of the engine hood. Thus, such arrangements only allow a small displacement of the engine hood, which significantly limits the protective potential for a person colliding therewith.

WO 2004/007247 A2 describes various actuators arranged underneath the engine hood for deflecting the engine hood, which can cause a sufficient displacement of the engine hood. Yet, where necessary, additional measures must also be met to cover vehicle components arranged adjacently to the engine hood (e.g. A-pillars), which can also lie in the collision region.

Exemplary embodiment of the invention are directed to providing an airbag arrangement having an improved protective effect in the event of a crash.

Accordingly, it is provided that the airbag is obtained and can be arranged on the motor vehicle in such a way that, in the unfilled state, it is in an end region of the sheathing and/or a particularly elongated vehicle pillar of the motor vehicle and can be unfolded by the filling inside the sheathing and/or longitudinally along at least one section of the sheathing and/or the vehicle pillar in the direction of a second end of the sheathing and/or the vehicle pillar.

In the end region of the sheathing and/or the vehicle pillar, a particularly large construction space can be provided. As a result of the arrangement in the end region of the sheathing and/or the vehicle pillar, in the airbag arrangement, particularly large airbags can be used, which can provide a particularly good protective effect in the event of a crash. As a result of the arrangement of the airbag in the sheathing, it can be achieved that, when filling with gas, the airbag unfolds along the sheathing and thus specifically along the vehicle pillar and covers this. In doing so, larger airbag cross-sections are possible than with known airbag arrangements. With such an airbag arrangement, a part of a shell of a motor vehicle can be deflected with an enlarged deflection path. Before filling with gas, the airbag is preferably arranged on only one of the two ends of the sheathing and is spaced apart from the other of the two ends. By filling with gas, the airbag can be inflated starting from the one end of the sheathing to the other end of the sheathing.

According to an embodiment, the sheathing can be fixed or is fixed on a moveable part of the motor vehicle, in particular with, for example, a longitudinal-sided end region. In doing so, tensile forces of the sheathing, e.g., as a result of its contraction, can be introduced into the moveable part. To do so, the airbag arrangement respectively comprises, for example, at least one fixing device fixed on the first and/or on the second end of the sheathing.

The moveable part is, for example, a part of a shell of the motor vehicle, in particular a vehicle hood, e.g., an engine hood or a trunk lid, or a hinge allocated to the moveable part (e.g., connected or able to be connected thereto). As a result of the airbag arrangement, such a moveable part can be deployed, for example, in order to obtain an improved protective effect for people located outside the vehicle.

It can be provided that, before filling with gas, the airbag only extends across at most half or at most a third of the longitudinal extension of the sheathing and/or the longitudinal extension of the vehicle pillar. With such size ratios, a particularly efficient unfolding of the airbag is possible.

Alternatively, or additionally, it can be provided that, in its state filled with gas, the airbag extends across at least one third or at least half of the longitudinal extension of the sheathing and/or the vehicle pillar, e.g., substantially across the entire longitudinal extension of the sheathing and/or the vehicle pillar. In this way, a particularly good protective effect can be achieved.

Before filling, the airbag can be able to be arranged on or in an (e.g., upper or lower in relation to the vertical direction of the vehicle) end section of the vehicle pillar. For example, the airbag is arranged in or adjacent to a lower region or in or adjacent to an upper region of an A-pillar in the motor vehicle. In these installation positions, depending on the design of the vehicle, a particularly large airbag can be housed.

The sheathing can be, for example, a fabric tube. The fabric tube can guide the unfolding airbag with respect to its unfolding direction.

The sheathing can comprise a reticular material or consist of a reticular material. Reticular materials can be spread particularly well.

The sheathing is formed, for example, longitudinally with a longitudinal extension. Filling the airbag can cause a shortening of the longitudinal extension of the sheathing. In particular, as a result of the use of a reticular material (e.g., in the form of a tubular net), the fabric tube can be extended by the bag and thus contracted in terms of length, e.g., by meshes of the reticular material being spread and thus being contracted in terms of length.

The sheathing can extend along the vehicle pillar when the airbag arrangement is mounted according to use on the motor vehicle. For example, the sheathing is formed in such a way that it can be inserted in a receiver in a vehicle pillar, e.g., the sheathing is substantially formed to fit exactly to the shape of the receiver.

Parts of the airbag arrangement can be surrounded by an at least partially flexible wrapping. In particular, the airbag and/or the sheathing can be at least sectionally, in particularly at least predominantly, surrounded by an at least partially flexible wrapping. Such a wrapping can protect the sheathing and the airbag from environmental influences and facilitate the installation of the airbag arrangement in the motor vehicle.

The wrapping is formed, for example, as a wrapping that shrinks under the effect of heat. For example, the wrapping is a shrinking tube, optionally with a coating on the inside. In doing so, the sheathing and/or the airbag can be introduced simply into the not yet shrunk wrapping during production. Subsequently, the wrapping is shrunk by the effect of heat, such that a package emerges that is particularly easy to install.

The airbag has, for example, at least two chambers. The airbag can be formed as a two-chamber airbag. The chambers are connected to each other by means of a through opening, for example. In doing so, a temporally offset unfolding of a first and a second chamber can be achieved. Apart from the opening, the two chambers are separated from each other, for example by means of at least one material ply of the airbag.

According to a development, it is provided that, in particular in relation to an uninflated, flatly extended state of the airbag, one of the two chambers at least partially surrounds the other of the two chambers. One of the two chambers can protrude into the other of the two chambers. The first chamber can virtually completely penetrate the second chamber. For example, one of the two chambers at least partially inherently receives the other of the two chambers. In doing so, a temporally offset unfolding of the airbag can be obtained initially substantially in a longitudinal direction (in particular in the longitudinal direction of the sheathing) and thereafter substantially in a width direction, for example by the inner chamber firstly and subsequently the second chamber being inflated.

According to a further aspect of the present invention, a motor vehicle is provided which comprises an airbag arrangement or several, in particular two, airbag arrangements according to any embodiment described herein.

BRIEF DESCRIPTION OF THE DRAWING FIGURES

The invention is subsequently explained in more detail with reference to the figures by means of the exemplary embodiments. Here are shown.

DETAILED DESCRIPTION

The explanations below take place by means of the depiction of a (single) airbag arrangement 1 for deflecting a part of a shell of a motor vehicle 2 for protecting a person located outside the motor vehicle 2. Reference is made to the fact that several, e.g., two, airbag arrangements 1 can be provided, e.g., respectively in the region of A-pillars 22 of the motor vehicle 2 on both sides of a windscreen 23.

Figure 1:
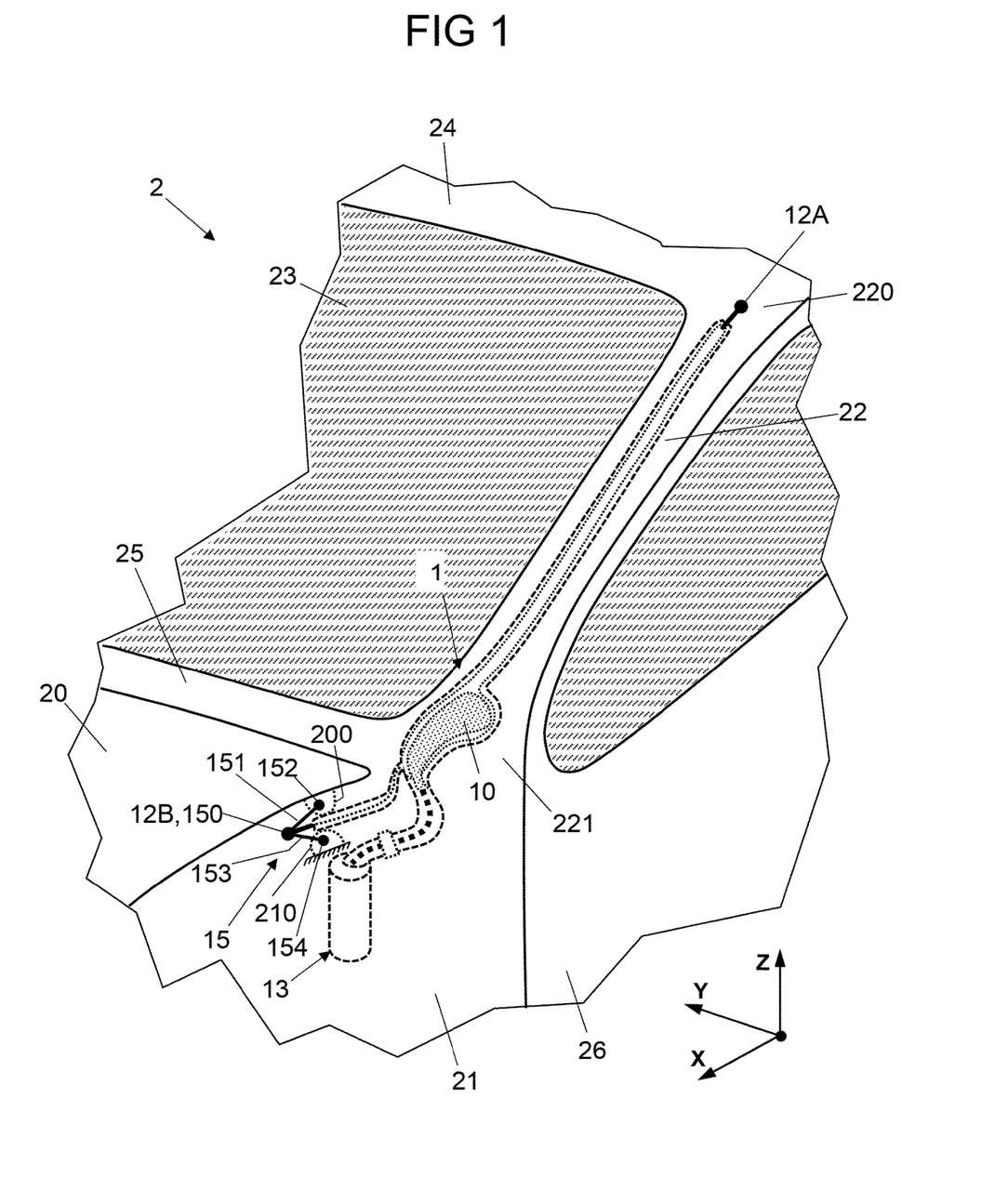
FIG. 1 an exemplary embodiment of an airbag arrangement arranged according to use on a motor vehicle, having an airbag in an uninflated state in a schematic depiction.
Figure 3:
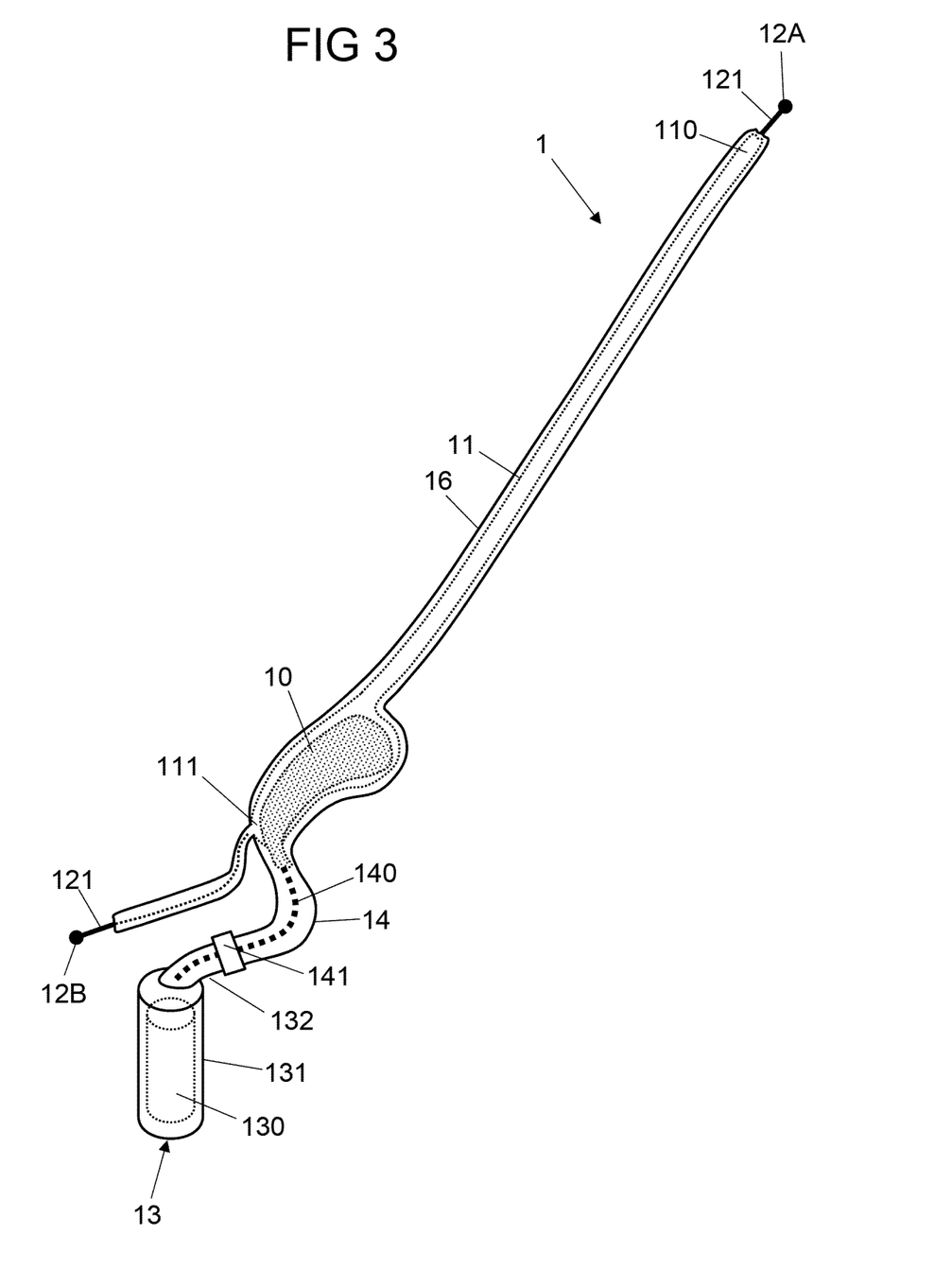
FIG. 3 the airbag arrangement in the uninflated state according to FIG. 1 before installation into a motor vehicle in a schematic depiction.

FIGS. 1 and 3 show the airbag arrangement 1 in the non-activated state. While FIG. 1 depicts the airbag arrangement 1 in a state installed in the motor vehicle 2, FIG. 3 shows the airbag arrangement 1 in the state before installation and in an enlarged depiction.

The airbag arrangement 1 comprises an airbag 10 housed in a sheathing 11. The airbag arrangement 1 further comprises a gas generator assembly 13, which is attached to the airbag 10 via a gas supply 14 for inflating the airbag 10. The sheathing 11 can be fixed on the motor vehicle 2 using two fixing devices 12A, 12B. The sheathing is presently formed as a fabric tube 11. The airbag 10, the sheathing 11 and the gas supply 14 are arranged inside the wrapping 16.

Presently, the airbag arrangement 1 is arranged with its end on the side of the gas generator fixed to the vehicle (e.g., on longitudinal supports). The airbag arrangement 1 is fixed on the motor vehicle next to the lower end 221 of a vehicle pillar 22 of the motor vehicle 2. Presently, the airbag arrangement 1 is fixed on the motor vehicle 2 in the region of a mudguard 21 near to the lower end 221 of the vehicle pillar, formed as an A-pillar 22, of the motor vehicle 2. Starting from its end on the side of the gas generator, the airbag arrangement 1 extends across the lower end 221 of the A-pillar 22, along this up to its upper end 220. According to FIG. 1, the airbag arrangement 1 extends up to a region, adjacent to the upper end 220 of the A-pillar 22, of a vehicle roof 24. The terms upper and lower end 220, 221 respectively refer to their location/position in relation to a vertical axis z of the vehicle. The vertical axis z of the vehicle forms, with a transverse axis y of the vehicle and a longitudinal axis x of the vehicle, the coordinate axes of a rectangular coordinate system. The A-pillar 22 extends between a windscreen 23 and a vehicle door 26.

As is shown, in particular, in FIG. 3, the gas generator assembly 13 comprises a gas generator 130. The gas generator 130 is arranged in a housing 131. The housing 131 is provided with apertures (not depicted) for guiding through an ignition electrical system of the gas generator 130 and/or for the gas emission (e.g., between a cover and the housing body or in the cover or housing body itself) after activating the gas generator 130. The housing 131 is provided with fastening possibilities (also not depicted) for fixing the housing 131 in the vehicle 2.

The wrapping 16 forms a branching. A branch of the branching runs along the gas guide 14. The wrapping 16 of the airbag arrangement 1 having its region forming the gas guide 14 is fixedly connected to a gas outlet 132 of the gas generator assembly 13 via suitable fixing means, e.g., in the form of the depicted clamp 141. The gas outlet 132 and/or the gas guide 14 can be provided with integrated channels or separate, gas-conducting elements for conducting the gases released by the gas generator 130. Presently, the gas supply 14 comprises a gas line 140. The gas line 140 is arranged inside the wrapping 16.

A region, expanded in terms of its cross-section (in comparison to the gas guide 14), of the wrapping 16 is attached to the gas guide 14. The expanded region of the wrapping 16 has only a small length (in comparison to the overall length of the wrapping 16) in the extension direction along the A-pillar 22. This region of larger cross-section serves to receive the airbag 10. The airbag 10 is folded together in its non-activated state.

In the state, installed in the vehicle 2, of the airbag arrangement 1, the airbag 10 is arranged on a lower end 221 of the A-pillar 22, since there the A-pillar 22 usually has a larger cross-section, i.e. more installation space is present for the housing of the airbag 10.

In relation to the vehicle surroundings, the airbag arrangement 1 is covered by cladding elements (decorative elements), which allow an unfolding of the airbag 10 in the event of a crash. The unfolding airbag 10 can push through the cladding elements and unfold to the outside of the motor vehicle 2.

In the further course (in particular up to the upper end 220 of the A-pillar 22), the wrapping 16 again has a smaller cross-section and can thus be housed in the A-pillar 22 without any issues. The smaller cross-section is thus possible in that, in this region, only the fabric tube 11 surrounding the airbag 10 is received by the wrapping 16, not the airbag 10. The fabric tube 11 extends from the folded airbag 10 up to the upper end 220 of the A-pillar 22. The section of smaller cross-section of the airbag arrangement 1 is arranged inside the A-pillar 22, e.g., in a housing chamber particularly longitudinally extended and provided for this.

The sheathing formed as the fabric tube 11 is elongated. The folded airbag 10 is arranged in the region of a longitudinal-sided first end 111 (here the lower end) of the fabric tube 11. The folded airbag 10 is arranged to be spaced apart from a longitudinal-sided second (here upper) end 110 opposite the first (lower) end of the fabric tube 11. The distance between the folded airbag 10 and the second (upper) end 110 of the fabric tube 11 corresponds to roughly the length of the A-pillar 22.

Figure 5:
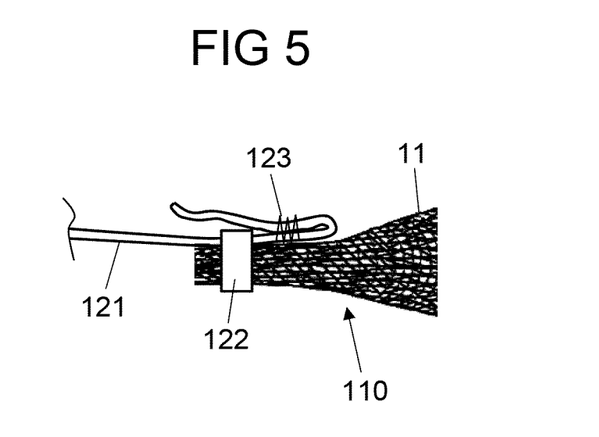
FIG. 5 an end section of a wrapping, formed as a fabric tube, of the airbag arrangement in a schematic depiction.

The fabric of the fabric tube 11 is formed reticularly. The reticular fabric of the fabric tube 11 has a relatively large mesh width, e.g., of more than 1 mm or more than 1 cm. With its upper end 110, the fabric tube 11 is fixed on the upper end 220 of the A-pillar 22 or on a region of the vehicle roof 24 adjacent thereto in a manner fixed to the vehicle. To that end, it is provided with a fixing device 12A, for example in the form of a retaining strap 121 having a metal tab 120 fixed thereon. The fixing device 12A presently protrudes from the wrapping 16. FIG. 5 shows an example of such a fixing device 12A. Alternatively to the retaining strap 121, the metal tab 120 can also be fixed directly on the end 110 of the fabric tube 11.

The arrangement of the folded airbag 10 in the fabric tube 11 when constructing the airbag arrangement can take place via the still open ends 110, 111 of the fabric tube 11. Alternatively, a supply via a slotted opening in the fabric tube 11 is also possible.

With its opposite lower end 111, the fabric tube 11 is attached to a vehicle hood, here in the form of an engine hood 20 of the motor vehicle 2, preferably on a hinge 15 allocated to the engine hood 20. Presently, the fabric tube 11 is connected to the engine hood 20 via the hinge 15. A fixing device 12B for fixing on the engine hood 20 or on the hinge 15 can be designed to be identical to the fixing device 12A described in the context of the fixing of the upper end 110 of the fabric tube 11. Because of the construction, however, the retaining strap 121 here has a greater length (than the upper fixing device 12A) and is preferably surrounded by the wrapping 16.

In the present exemplary hinge 15, a first hinge element 151 is allocated to the engine hood 20, in particular pivotably fixed with one end on this. Presently, the engine hood 20 provides a fixing point 200 to which the first hinge element 152 is pivotably fixed (with an attachment point 152). A second hinge element 152 is pivotably articulated with one end on an element fixed to the vehicle. Presently, a fixing point 210 covered by the mudguard 21 is provided, on which the second hinge element 152 is pivotably fixed (with an attachment point 154).

With their other respective ends (opposite the attachment points 152, 154), the two hinge elements 151, 152 are connected to each other to be pivotable in relation to each other, presently by means of a joint 150. Presently, the fabric tube 11 is also fixed to this region (here the joint 150) with its lower end 111 via the lower fixing device 12B (via the allocated retaining strap 121 and the metal tab 120).

In the non-activated state, shown in FIG. 1, of the airbag arrangement 1, the engine hood 20 can be pivoted around a pivot axis parallel to the transverse axis y of the vehicle for access to an engine chamber (for example for maintenance work) after releasing an unlocking system in the front region, not depicted, of the vehicle 2. Here, the pivot axis is determined by the hinge 15. Presently, the pivot axis runs through the articulating point, for example, of the first hinge element 151 of the hinge 15 (shown and lying opposite in the y-direction) on the fixing point 200 of the engine hood 20. The hinge 15 is preferably designed to be able to be bolted. In the bolted state, the hinge 15 is not pivotable on the joint 150. Alternatively, the joint 150 forms the pivot axis.

The wrapping 16 serves to protect the airbag arrangement 1 from dust, moisture and other environmental influences. The wrapping 16 is preferably implemented by means of a correspondingly dimensioned shrinking tube made of a thermoplastic plastic. The wrapping 16 can be provided with a hot adhesive on its inside for better sealing. In particular, it can be provided that the wrapping 16 is held in position against the parts to be wrapped (e.g., the fabric tube 11 and the airbag 10) under the influence of heat. This design provides the shape for the airbag arrangement 1, yet simultaneously enables a (certain) flexibility in the extension direction. Thus, installation of the airbag arrangement 1 into the vehicle 2 without any problems is made possible. In part, stiffening elements can be provided on and/or in the wrapping.

A part of the shell of the motor vehicle 2, in particular in the front region of the motor vehicle 2, presently the engine hood 20 of the motor vehicle 2, can be deflected in relation to the rest of the vehicle 2 by means of the airbag arrangement 1, in particular deployed. In addition, the airbag arrangement 1 can provide a padding of a vehicle pillar 22, as is explained below, such that a particularly effective protective effect can be obtained.

Figure 2:
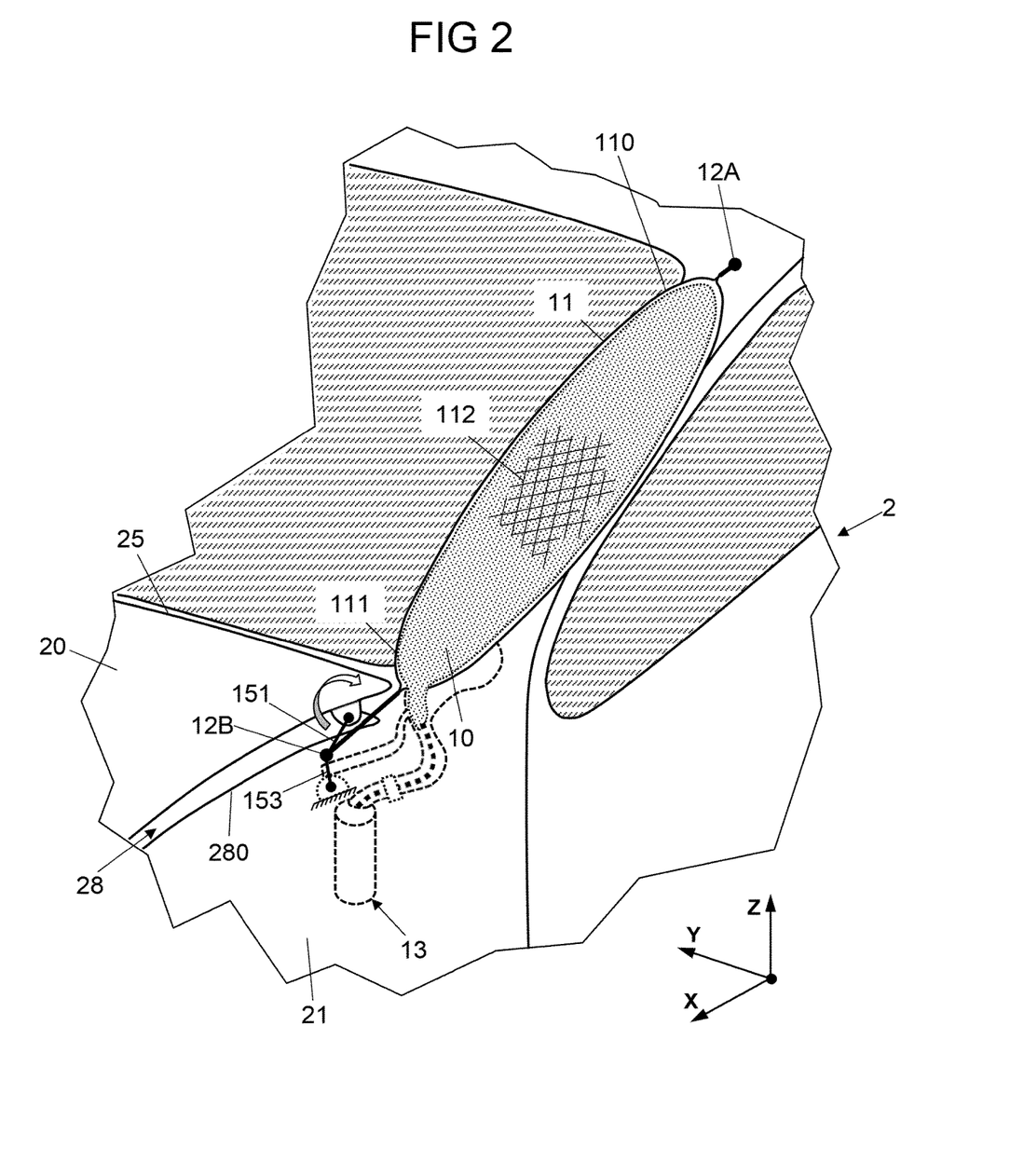
FIG. 2 the airbag arrangement according to FIG. 1 having the airbag in an inflated state.

In FIG. 2, the airbag arrangement 1 according to FIG. 1 is shown with the airbag 10 in an unfolded state.

After sensing a possible collision with a person on the front region of the vehicle (by means of a sensor device provided for this) and the resulting activation of the gas generator 130, the gases released by this were introduced into the airbag 10 via the gas line 140. The thus filling airbag 10 has opened the wrapping 16 and the cladding elements of the airbag arrangement 1 on the A-pillar 22, such that the airbag 10 could emerge together with the fabric tube 11 surrounding it from its housing chamber.

The airbag 10, initially arranged only in the region of the lower end 111 inside the fabric tube 11, has subsequently unfolded in its extension direction (along the A-pillar) in the fabric tube 11 up to its upper end 110. By filling the airbag 10, it can thus be unfolded inside the fabric tube 11 from one end (here the lower end 111) of the fabric tube 11 to the other end (here the upper end 110) of the fabric tube 11.

In the unfolded state shown in FIG. 2, the airbag 10 completely or substantially completely fills the fabric tube 11.

The fabric tube 11 has a reticular structure 112. The reticular structure 112 comprises meshes. The meshes are spread in the longitudinal extension direction of the fabric tube 11 and/or placed together transversely to the longitudinal extension direction of the fabric tube 11. When filling the fabric tube 11, it is expanded transversely to the extension direction of the A-pillar 22. As a result of its reticular structure 112 (e.g., by spreading the meshes placed together transversely to the extension direction of the A-pillar 22), the fabric tube 11 is here shortened in its longitudinal extension direction (along the extension direction of the A-pillar 22).

Due to the shortening, the fabric tube 11 is braced between its two fixing points on the end side on the vehicle 2. Here, the two retaining straps 121 are tightened and tensile forces are introduced into the fixing points. The forces emerging here are designed (by the corresponding installation of the airbag arrangement 1) in such a way that the lower fixing point of the retaining strap 121 on the hinge 15, the retaining strap being allocated to the lower end 111, is thus moved in the direction of the A-pillar 22. Prior to this, an unlocking of the hinge 15 takes place to such an extent that a movement of the hinge elements 151, 153 is possible (and different from that depicted above for the maintenance works). The unlocking of the hinge 15 takes place by means of a pull on the retaining strap 121 or by a separately controlled device.

Emerging forces and the constructive design of the hinge 15 cause a raising of the engine hood 20 upwards in the vertical direction z of the vehicle. The thus emerging distance between the engine hood 20 and the vehicle components lying below it enables a sufficiently free deformation of the engine hood 20 in the event of a collision with a person. In doing so, the danger of injuries to the person can be substantially reduced. It is shown in FIG. 2 that the engine hood 20 is raised relative to an opening 280 of an engine chamber 28, such that the engine hood 20 has an enlarged distance from the engine chamber 28 compared to the distance in FIG. 1.

Raising the engine hood 20 is presently accompanied by a displacement of the engine hood 20 in opposition to a longitudinal direction of the vehicle on the longitudinal axis x of the vehicle, in the direction of the windscreen 23. Thus, lower regions of the windscreen 23 and/or parts of the vehicle 2 abutting thereon (e.g. a cowl 25) can additionally be covered which further improves the protection for a person colliding in the event of a crash.

The inflated and unfolded airbag 10 covers the A-pillar 22 and, in doing so, provides a padding of the A-pillar 22. In doing so, the protection for a person colliding in the event of a crash is improved even further.

Figure 4:
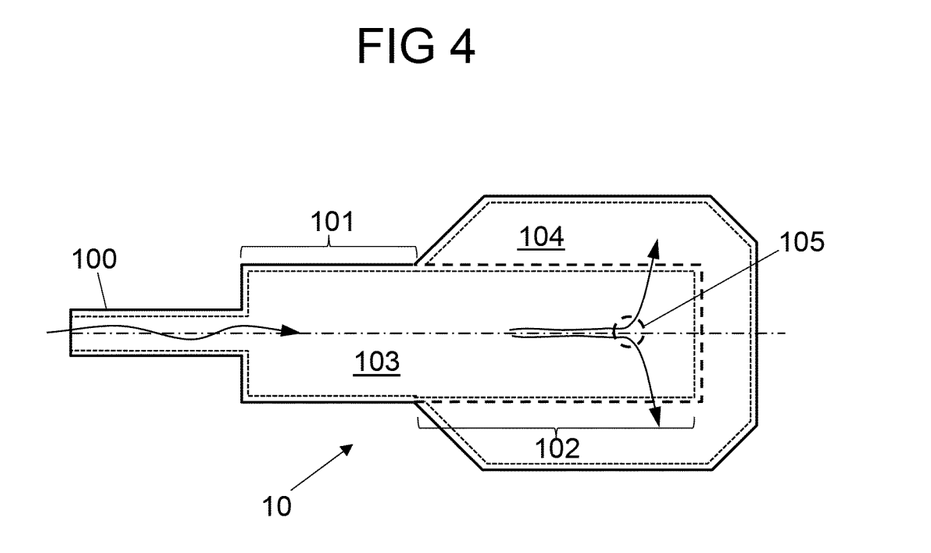
FIG. 4 the airbag of the airbag arrangement according to FIGS. 1 to 3 in a schematic depiction.

FIG. 4 shows the airbag 10 of the airbag arrangement 1 in a preferred embodiment as a multi-chamber bag. Presently, the airbag consists of a first chamber 103 and a second chamber 104 partially surrounding it. The first chamber 103 runs from a region formed as a gas inlet 100 having a first section 101 outside the second chamber 104. A second section 102 attached to it protrudes into the second chamber 104. Along the longitudinal extension of the first chamber 103, its second section 102 reaches virtually to the end of the second chamber 104.

The first chamber 103 is formed to be elongated and extends from its gas inlet 100 to a sealed end opposite the gas inlet. In the second section 102, the first chamber 103 is provided with an opening 105. Gases released by the gas generator 130 and introduced via the gas inlet 100 flow through the opening 105 from the first chamber 103 into the second chamber 104. The opening 105 forms a through opening for gases from the first chamber 103 into the second chamber 104. The opening 105 is arranged in a region facing towards its sealed end along the longitudinal extension of the first chamber 103.

Both chambers 103, 104 can respectively consist of two congruent cut-outs which are at least partially connected (e.g., stitched) to each other along their edges. Both chambers are connected (e.g., stitched) to each other to complete the airbag.

Transversely to its longitudinal extension, the first chamber 103 has a (in particular substantially) small cross-section in comparison to the second chamber 104. In particular in conjunction with the details described further above, this enables the first chamber 103 to be able to be unfolded when filling without problems in the fabric tube 11 surrounding the airbag 10 (from its lower end 111 to the upper end 110). When unfolding the first chamber 103, the second chamber 104 that is not or is only slightly filled is also positioned in the fabric tube 11 along the longitudinal extension of the fabric tube 11 (here the extension direction along the A-pillar 22). The first chamber 103 and the second chamber 104 can be unfolded temporally offset to each other, e.g., here the opening 105 serves as a throttle.

Substantially only after the complete extension (as a result of the filling) of the first chamber 103, the gases reach the pre-positioned second chamber 104 and also fill this. A further expansion of the fabric tube 11 transversely to its extension direction is caused by the filling of the second chamber 104, wherein its maximum extension in this direction is set by the cross-section of the second chamber 104. The expansion of the fabric tube 11 causes the shortening of the fabric tube. The shortening of the fabric tube 11 introduces tensile forces into the lower fixing point 200 on the engine hood 20. The maximum extension of the fabric tube transversely to its extension direction and thus the forces introduced into the engine hood 20 can be set via the cross-section of the second chamber 104.

FIG. 5 shows a possible fixing of a retaining strap 121 on the fabric tube 11 by means of a clamp 122.

The end to be fixed (here the upper end 110 by way of example) of the fabric tube 11 is condensed (e.g., gathered), and the retaining strap 121 is clamped on the end by the clamp 122 (in particular in a force-fit manner). Alternatively, or additionally to the gathering, the fabric tube 11 can be woven correspondingly particularly convergently on its ends 110, 111. In order to prevent the end of the retaining strap 121 from being pulled under the clamp 122 when forces are introduced, the retaining strap 121 is wrapped around once, for example. The regions of the retaining strap 121 lying one above the other are (e.g., partially) stitched together. Thus, in the mounted state, the stitched regions preferably form an additionally form-fit connection for securing the retaining strap 121.

Figure 6:
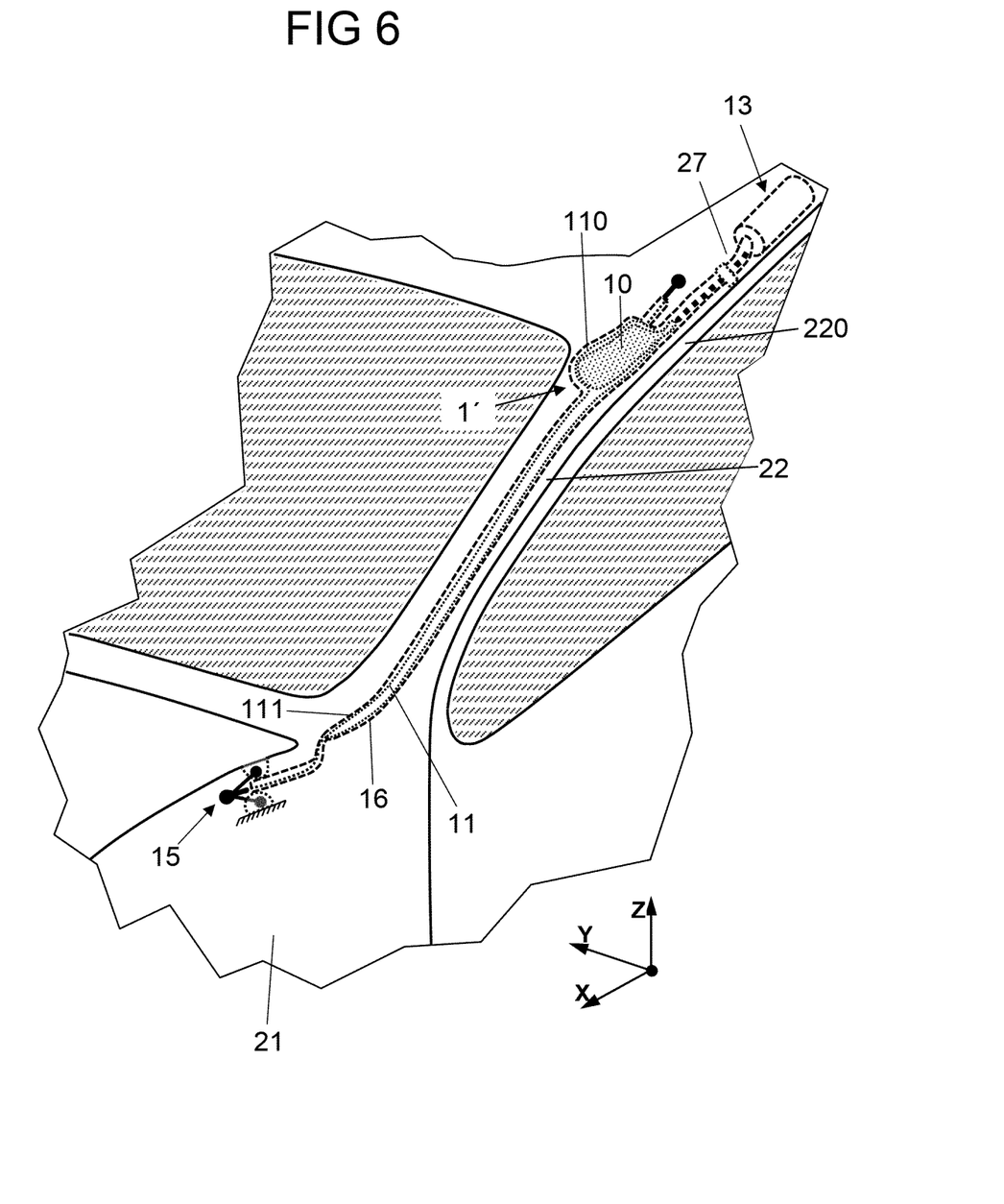
FIG. 6 a further exemplary embodiment of an airbag arrangement arranged according to use on a motor vehicle, having an airbag in an uninflated state in a schematic depiction.

The depiction according to FIG. 6 shows an alternative installation position of the airbag arrangement 1' which is here arranged adjacent to the upper end 220 of the A-pillar 22 with its end 110 on the generator side fixed to the vehicle (e.g., on a roof rail 27) in the edge region of the vehicle roof 24. Starting from this, it extends across the upper end 220 of the A-pillar 22, along this up to its lower end 221 or a region adjacent to the mudguard 21. Here, the airbag 10 is arranged inside the fabric tube 11 at the start only in the region of the upper end 110 of the fabric tube 11. Accordingly, the airbag 10 presently unfolds in the fabric tube 11 along the A-pillar 22 up to its lower end 221. In the inflated state not shown, the airbag 10 completely or substantially completely fills the fabric tube 11 (comparable to the state of the airbag arrangement 1 according to FIG. 2). In general, the explanations made in conjunction with the embodiment of the airbag arrangement 1 according to FIG. 1-3 correspondingly also apply to the airbag arrangement 1' shown in FIG. 5.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An airbag arrangement for a motor vehicle, the airbag arrangement comprising:
    an airbag configured to be unfolded by filling with a gas; and
    a sheathing, in which the airbag is arranged before and after filling with the gas, wherein the sheathing has an upper end and a lower end,
    wherein the airbag is configured to be arranged on the motor vehicle in such a way that
    before filling, the airbag is located only in one of the upper and lower ends of the sheathing and in a corresponding one of an upper and lower end of a vehicle pillar of the motor vehicle, and
    the airbag can be unfolded by filling inside the sheathing and along at least one section of the vehicle pillar from the one of the upper and lower ends of the sheathing and the vehicle pillar towards the other one of the upper and lower ends of the sheathing and the vehicle pillar.

2. The airbag arrangement of claim 1, wherein before filling, the airbag is arranged on or in a lower or upper end section of the vehicle pillar in relation to a vertical direction of the vehicle.

3. The airbag arrangement of claim 1, wherein the sheathing is a fabric tube.

4. The airbag arrangement of claim 1, wherein the sheathing comprises a reticular material or consists of a reticular material.

5. The airbag arrangement of claim 1, wherein the sheathing is elongated with a longitudinal extension, and a filling of the airbag causes a shortening of the longitudinal extension of the sheathing.

6. The airbag arrangement of claim 1, wherein the sheathing extends along the vehicle pillar when the airbag arrangement is assembled according to use on the motor vehicle.

7. The airbag arrangement of claim 1, further comprising:
    at least one fixing device attached to the first or to the second end of the sheathing, wherein the fixing device is configured to fix the sheathing on a moveable part of the motor vehicle.

8. The airbag arrangement of claim 7, wherein the moveable part of the motor vehicle is a vehicle hood or a hinge of the vehicle hood.

9. The airbag arrangement of claim 1, wherein the airbag and/or the sheathing are at least sectionally surrounded by an at least partially flexible wrapping.

10. The airbag arrangement of claim 9, wherein the wrapping is a wrapping that shrinks under the influence of heat.

11. The airbag arrangement of claim 1, wherein the airbag has at least two chambers.

12. The airbag arrangement of claim 11, wherein one of the two chambers surrounds the other one of the two chambers.

13. An airbag arrangement for a motor vehicle, the airbag arrangement comprising:
    an airbag configured to be unfolded by filling with a gas; and
    a sheathing, in which the airbag is arranged before and after filling with the gas,
    wherein the airbag is configured to be arranged on the motor vehicle in such a way that
    before filling the airbag is located in a region of a first end of the sheathing and in a region of a vehicle pillar of the motor vehicle, and
    the airbag can be unfolded by filling inside the sheathing and along at least one section of the vehicle pillar towards a second end of the sheathing and the vehicle pillar,
    wherein before filling, the airbag only extends across at most half or at most a third of a longitudinal extension of the sheathing and a longitudinal extension of the vehicle pillar.

14. The airbag arrangement of claim 13, wherein in a filled state, the airbag extends across at least a third or at least half of the longitudinal extension of the sheathing and the longitudinal extension of the vehicle pillar.

15. A motor vehicle, comprising:
    a vehicle pillar having an upper end and lower end; and
    an airbag arrangement, comprising
        an airbag configured to be unfolded by filling with a gas; and
        a sheathing, in which the airbag is arranged before and after filling with the gas, wherein the sheathing has an upper end and a lower end,
        wherein the airbag is arranged on the motor vehicle in such a way that
        before filling,. the airbag is located only in one of the upper and lower ends of the sheathing and the vehicle pillar, and
        the airbag can be unfolded by filling inside the sheathing and along at least one section of the vehicle pillar from the one of the upper and lower ends of the sheathing and vehicle pillar towards the other one of the upper and lower ends of the sheathing and the vehicle pillar.

* * * * *